United States Patent
Wagoner et al.

(10) Patent No.: US 10,439,533 B2
(45) Date of Patent: Oct. 8, 2019

(54) POWER CONVERTER FOR DOUBLY FED INDUCTION GENERATOR WIND TURBINE SYSTEMS

(71) Applicant: General Electric Company, Schenectady, NY (US)

(72) Inventors: Robert Gregory Wagoner, Roanoke, VA (US); Govardhan Ganireddy, Bangalore (IN); Saurabh Shukla, Clifton Park, NY (US); Rajni Kant Burra, Clifton Park, NY (US); Ravisekhar Nadimpalli Raju, Clifton Park, NY (US); Rui Zhou, Niskayuna, NY (US); Rajib Datta, Niskayuna, NY (US); John Leo Bollenbecker, Albany, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/399,049

(22) Filed: Jan. 5, 2017

(65) Prior Publication Data

US 2018/0191280 A1    Jul. 5, 2018

(51) Int. Cl.
*H02P 9/00* (2006.01)
*F03D 9/25* (2016.01)
(Continued)

(52) U.S. Cl.
CPC .............. *H02P 9/007* (2013.01); *F03D 9/255* (2017.02); *H02M 3/335* (2013.01); *H02M 3/337* (2013.01);
(Continued)

(58) Field of Classification Search
CPC ............ H02P 9/007; F03D 9/003; F03D 9/25
See application file for complete search history.

(56) References Cited

U.S. PATENT DOCUMENTS

| 5,719,758 A | 2/1998 | Nakata et al. |
| 6,699,987 B2 | 3/2004 | Hillebrand et al. |

(Continued)

FOREIGN PATENT DOCUMENTS

| EP | 2290799 A1 | 2/2011 |
| EP | 2 709 266 A2 | 3/2014 |
| WO | 2016/066169 A1 | 5/2016 |

OTHER PUBLICATIONS

Islam et al., "Power Converters for Small- to Large-Scale Photovoltaic Power Plants", Power Converters for Medium Voltage Networks, Chapter 2, Springer-Verlag Berlin Heidelberg 2014, pp. 17-49.

(Continued)

*Primary Examiner* — Sean Gugger
(74) *Attorney, Agent, or Firm* — Dority & Manning, P.A.

(57) ABSTRACT

Power converters for use in wind turbine systems are included. For instance, a wind turbine system can include a wind driven doubly fed induction generator having a stator and a rotor. The stator is configured to provide a medium voltage alternating current power on a stator bus of the wind turbine system. The wind turbine system includes a power converter configured to convert a low voltage alternating current power provided by the rotor to a medium voltage multiphase alternating current output power suitable for provision to an electrical grid. The power converter includes a plurality conversion modules. Each conversion module includes a plurality of bridge circuits. Each bridge circuit includes a plurality of silicon carbide switching devices coupled in series. Each conversion module is configured to provide a single phase of the medium voltage multiphase alternating current output power on a line bus of the wind turbine system.

19 Claims, 7 Drawing Sheets

(51) Int. Cl.
*H02M 3/335* (2006.01)
*H02M 3/337* (2006.01)
*H02M 5/458* (2006.01)
*H02M 1/00* (2006.01)

(52) U.S. Cl.
CPC ..... *H02M 3/33576* (2013.01); *H02M 5/4585* (2013.01); *F03D 9/25* (2016.05); *H02M 2001/0077* (2013.01); *Y02E 10/725* (2013.01)

(56) References Cited

U.S. PATENT DOCUMENTS

| | | | |
|---|---|---|---|
| 6,869,640 B2 | 3/2005 | Yoshihara et al. | |
| 6,924,909 B2 | 8/2005 | Lee et al. | |
| 8,310,102 B2 | 11/2012 | Raju | |
| 8,659,178 B2 | 2/2014 | Arlaban et al. | |
| 9,166,495 B2 | 10/2015 | Guan | |
| 9,587,626 B2 | 3/2017 | Sadaba et al. | |
| 9,667,457 B2 * | 5/2017 | Yamazaki | H04L 25/4906 |
| 2003/0052643 A1 | 3/2003 | Sweo | |
| 2005/0012487 A1 | 1/2005 | Skeist et al. | |
| 2006/0097519 A1 * | 5/2006 | Steinke | H02J 3/36 290/44 |
| 2009/0196082 A1 * | 8/2009 | Mazumder | H02M 5/458 363/132 |
| 2012/0175962 A1 * | 7/2012 | Zhan | H02J 1/102 307/82 |
| 2012/0267955 A1 * | 10/2012 | Zhan | H02J 1/06 307/31 |
| 2013/0182465 A1 | 7/2013 | Wang et al. | |
| 2013/0343089 A1 * | 12/2013 | Gupta | H02M 7/4807 363/16 |
| 2014/0078800 A1 | 3/2014 | Wagoner et al. | |
| 2015/0049524 A1 * | 2/2015 | Wagoner | H02M 7/483 363/37 |
| 2015/0070939 A1 * | 3/2015 | Gupta | H02J 3/36 363/17 |
| 2015/0108761 A1 * | 4/2015 | Bala | F01D 15/10 290/54 |
| 2015/0337808 A1 * | 11/2015 | Kang | F03D 7/048 290/44 |
| 2015/0365031 A1 * | 12/2015 | Wessels | H02J 3/1885 290/44 |
| 2016/0261198 A1 * | 9/2016 | Li | H02M 1/15 |
| 2016/0294296 A1 * | 10/2016 | Lee | H02M 1/4258 |

OTHER PUBLICATIONS

International Search Report and Written Opinion issued in connection with corresponding PCT Application No. PCT/US2017/067628 dated Apr. 23, 2018.
Wagoner, R.G., et al., Power Converter for Energy Systems, GE Co-Pending U.S. Appl. No. 15/399,001, filed Jan. 5, 2017.
Wagoner R.G., et al., Power converter for full conversion wind turbine systems, GE Co-Pending U.S. Appl. No. 15/399,067, filed Jan. 5, 2017.
Baron et al., Breaking the 34.5kV Standard, Drawing on hydro experience, Acciona extols use of 12kV collection system to lower energy costs through elimination of step-up transformers, Wind Systems Magazine, Apr. 2013, pp. 48-54.
Olonso Sadaba et al., Wind Generation Control Strategies for Grid Integration Acciona Windpower Experience, ResearchGate, Acciona Windpower, S.A., uploaded 2015, 11 Pages. https://www.researchgate.net/publication/267966410.

* cited by examiner

POWER CONVERTER FOR DOUBLY FED INDUCTION GENERATOR WIND TURBINE SYSTEMS

FIELD OF THE INVENTION

The present subject matter relates generally to renewable energy sources, and more particularly to power converter topologies for doubly fed induction generator wind turbine systems.

BACKGROUND OF THE INVENTION

Wind turbines have received increased attention as a renewable energy source. Wind turbines use the wind to generate electricity. The wind turns multiple blades connected to a rotor. The spin of the blades caused by the wind spins a shaft of the rotor, which connects to a generator that generates electricity. Certain wind turbine systems include a doubly fed induction generator (DFIG) to convert wind energy into electrical power suitable for output to an electrical grid. DFIGs are typically connected to a converter that regulates the flow of electrical power between the DFIG and the grid. More particularly, the converter allows the wind turbine to output electrical power at the grid frequency regardless of the rotational speed of the wind turbine blades.

A typical DFIG system includes a wind driven DFIG having a rotor and a stator. The stator of the DFIG is coupled to the electrical grid through a stator bus. A power converter is used to couple the rotor of the DFIG to the electrical grid. The power converter can be a two-stage power converter including both a rotor side converter and a line side converter. The rotor side converter can receive alternating current (AC) power from the rotor via a rotor bus and can convert the AC power to a DC power. The line side converter can then convert the DC power to AC power having a suitable output frequency, such as the grid frequency. The AC power is provided to the electrical grid via a line bus. An auxiliary power feed can be coupled to the line bus to provide power for components used in the wind turbine system, such as fans, pumps, motors, and other components of the wind turbine system.

Figure 1:
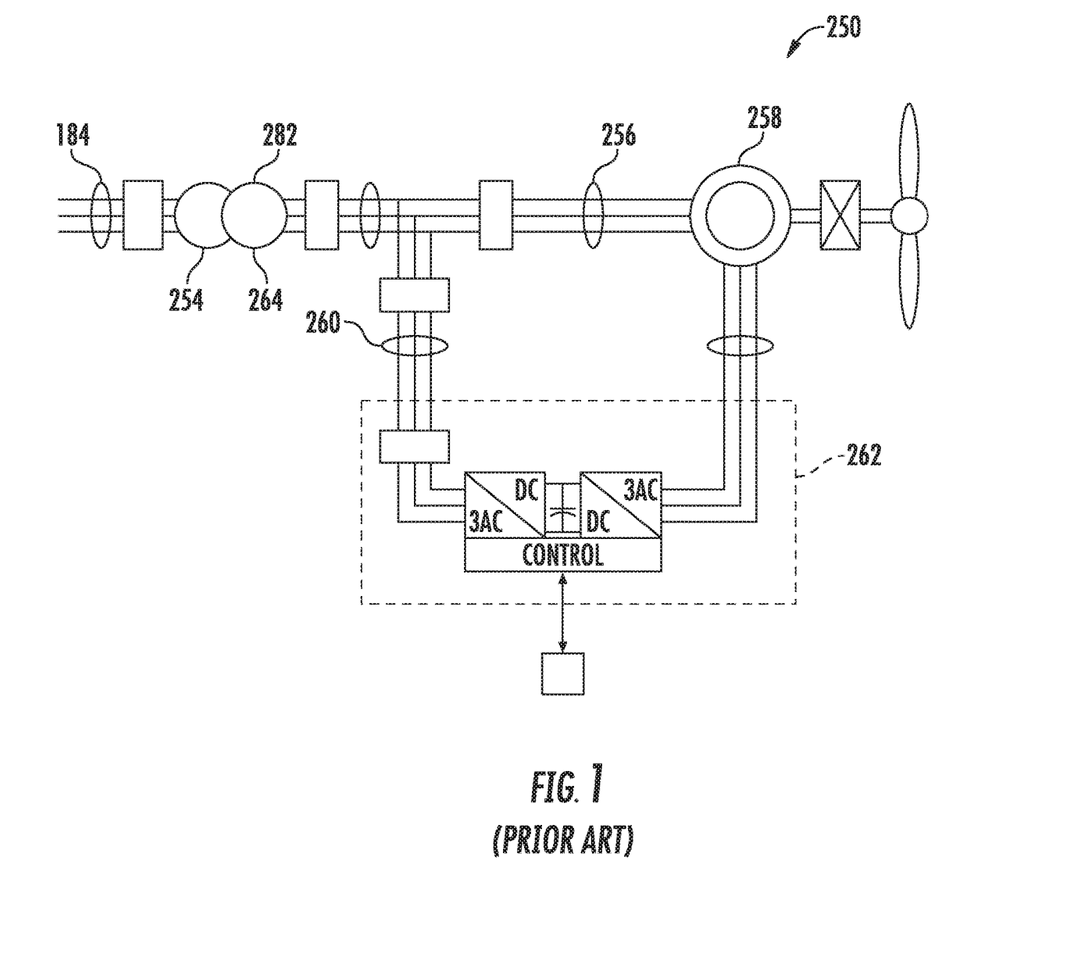
FIG. 1 depicts an example DFIG wind turbine system.

A typical DFIG system includes a two-winding transformer having a medium voltage primary (e.g. 6 KVAC, 12 KVAC, etc.) and a low voltage secondary (e.g. 575 VAC, 690 VAC, etc.) to couple the DFIG system to the electrical grid. As used herein, the term "low voltage" can refer to voltages less than or equal to 1.5 kV, and the term "medium voltage" can refer to voltages greater than 1.5 kV and less than 100 kV. For instance, FIG. 1 depicts an example DFIG system 250 having such two-winding transformer 252. As shown, a high voltage primary winding 254 of the transformer 252 can be coupled to the high voltage electrical grid 184. The stator bus 256 can provide AC power from the stator of a DFIG 258 and the line bus 260 can provide AC power from a power converter 262 that can be coupled to a low voltage secondary winding 264 of the transformer 252. In the system 250, the output power of the stator of the DFIG 258 and the output power of the power converter 262 are operated at approximately the same voltage and combined into the single transformer secondary winding at the low voltage.

Some DFIG systems have included a three winding transformer to couple the DFIG system to the electrical grid. The three winding transformer can have a medium voltage (e.g. greater than 12 KVAC) primary winding coupled to the electrical grid, a medium voltage (e.g. 6 KVAC) secondary winding coupled to the stator bus, and a low voltage (e.g. 575 VAC, 690 VAC, etc.) auxiliary winding coupled to the line bus. The three winding transformer arrangement can be preferred in increased output power systems (e.g. 3 MW systems) as it reduces the current in the stator bus and other components on the stator side of the DFIG, such as a stator synch switch.

Such transformers can be used to increase the low voltage provided by the power converter via the line bus to a medium voltage suitable for output to the electrical grid. However, the transformers can be costly and can have a considerable effect on the overall size of the DFIG system.

BRIEF DESCRIPTION OF THE INVENTION

Aspects and advantages of embodiments of the present disclosure will be set forth in part in the following description, or may be learned from the description, or may be learned through practice of the embodiments.

One example embodiment of the present disclosure is directed to a wind turbine system. The wind turbine system includes a wind driven doubly fed induction generator having a stator and a rotor. The stator is coupled to an electrical grid. The stator is configured to provide a medium voltage alternating current power on a stator bus of the wind turbine system. The wind turbine system further includes a power converter configured to convert a low voltage alternating current power provided by the rotor to a medium voltage multiphase alternating current output power suitable for provision to the electrical grid. The power converter includes a plurality conversion modules. Each conversion module includes a plurality of bridge circuits. Each bridge circuit includes a plurality of silicon carbide switching devices coupled in series. Each conversion module is configured to provide a single phase of the medium voltage multiphase alternating current output power on a line bus of the wind turbine system.

Another example aspect of the present disclosure is directed to a power converter for use in a doubly fed induction generator wind turbine system having a rotor and a stator. The stator is configured to be coupled to an electrical grid. The stator is configured to provide a medium voltage alternating current power on a stator bus of the wind turbine system. The power converter includes a plurality of conversion modules. Each conversion module includes a plurality of bridge circuits. Each bridge circuit includes a plurality of silicon carbide switching devices coupled in series. The power converter is configured to convert a low voltage alternating current power provided by the rotor to a medium voltage multiphase alternating current output power suitable for provision to the electrical grid. Each conversion module is configured to provide a single phase of the medium voltage multiphase alternating current output power on a line bus of the wind turbine system.

Yet another example aspect of the present disclosure is directed to a power conversion system including a plurality of conversion modules. Each conversion module includes a plurality of bridge circuits and an isolation transformer coupled to at least two of the bridge circuits. Each bridge circuit includes a plurality of switching devices coupled in series. The power conversion system is configured to convert a low voltage alternating current power provided by a doubly fed induction generator to a medium voltage multiphase alternating current output power suitable for provision to an alternating current power system. Each conversion module is configured to provide a single phase of the medium voltage multiphase alternating current output power on a line bus associated with the power conversion system.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to power converters for use in a doubly fed induction generator (DFIG) system. In particular, example aspects of the present disclosure are directed to power converters capable of converting a low voltage (LV) direct current (DC) voltage to a medium voltage (MV) alternating current (AC) voltage. The DFIG system can include a wind driven doubly fed induction generator having a rotor and a stator. A power converter can be used to couple the rotor of the doubly fed induction generator to an electrical grid. In some implementations, the power converter can be a two stage power converter that includes a rotor side converter and a line side converter coupled together by a DC link. In some implementations, the power converter can be a single stage converter. The power converter (e.g. the rotor side converter and/or the line side converter) can include a plurality of bridge circuits coupled in parallel. Each of the bridge circuits can include a pair of switching devices coupled in series with one another. For instance, in some implementations, at least a subset of the switching devices can be silicon carbide (SiC) metal-oxide-semiconductor field-effect transistors (MOSFETs). In some implementations, at least a subset of the switching devices can be insulated gate bipolar transistors (IGBTs). The bridge circuits can be controlled, for instance using gate timing commands provided to the switching devices, to provide a desired output to the electrical grid.

According to example aspects of the present disclosure the power converter can include a plurality of power conversion modules. Each power conversion module can be associated with a single phase of a multiphase (e.g. three-phase) AC power. In this manner, the number of power conversion modules can correspond to the number of phases in the multiphase AC power. Each power conversion module can include one or more module branches. The module branches can include a plurality of bridge circuits coupled in parallel. The module branches can further include an isolation transformer coupled to at least a subset of the bridge circuits. The module branches can be coupled to each other in parallel on a LV side of the conversion module, and in series on a MV side of the conversion module.

In particular, the module branches can be configured to convert a LV DC input power to a MV AC output power, and to provide the MV AC output power on a line bus of the DFIG system. For instance, the SiC MOSFETs can be switched at a sufficient frequency to allow for small scale isolation transformers to be implemented within each of the module branches. The isolation transformers can be configured as step-up or step-down transformers depending on the direction of the flow of power through the module branches. More particularly, the transformer winding facing the MV side of the module branch can have a greater number of turns than the transformer winding facing the LV side of the module branch. The particular configurations of the transformers can be selected based at least in part on the grid voltage and/or the voltage provided by the DFIG rotor.

Each module branch contributes to at least a portion of the MV AC output. In this manner, the number of module branches in each conversion module can be determined based at least in part on a desired AC output. In some implementations, the conversion modules can be replaceable units, such that the power converter can be implemented in a modular manner by adding or removing the conversion module units as desired. For instance, the conversion modules can be configured as individual units capable of being selectively coupled to the power converter through one or more interface components. In this manner, a technician or user of the wind turbine system can add or remove the modules by coupling the modules to the system via the interface components.

Implementing power converters in accordance with example aspects of the present disclosure within the DFIG system can allow the line bus to be coupled directly to the MV stator bus without the need for a transformer (e.g. a 50 Hz transformer of 60 Hz transformer) to convert the line bus voltage to a MV suitable for the electric grid. In this manner, the 50/60 Hz transformer can be replaced by smaller, lower frequency transformers in each module branch. Such smaller module branch transformers can allow for an overall reduction in size of the DFIG system. In addition, the use of SiC MOSFETs as switching devices in the power converter can increase an efficiency of the power converter via increased switching frequencies and reduced switching losses relative, for instance, to IGBT switching devices. It will be appreciated that any suitable high frequency switching device can be used to provide the increased switching frequencies.

Figure 2:
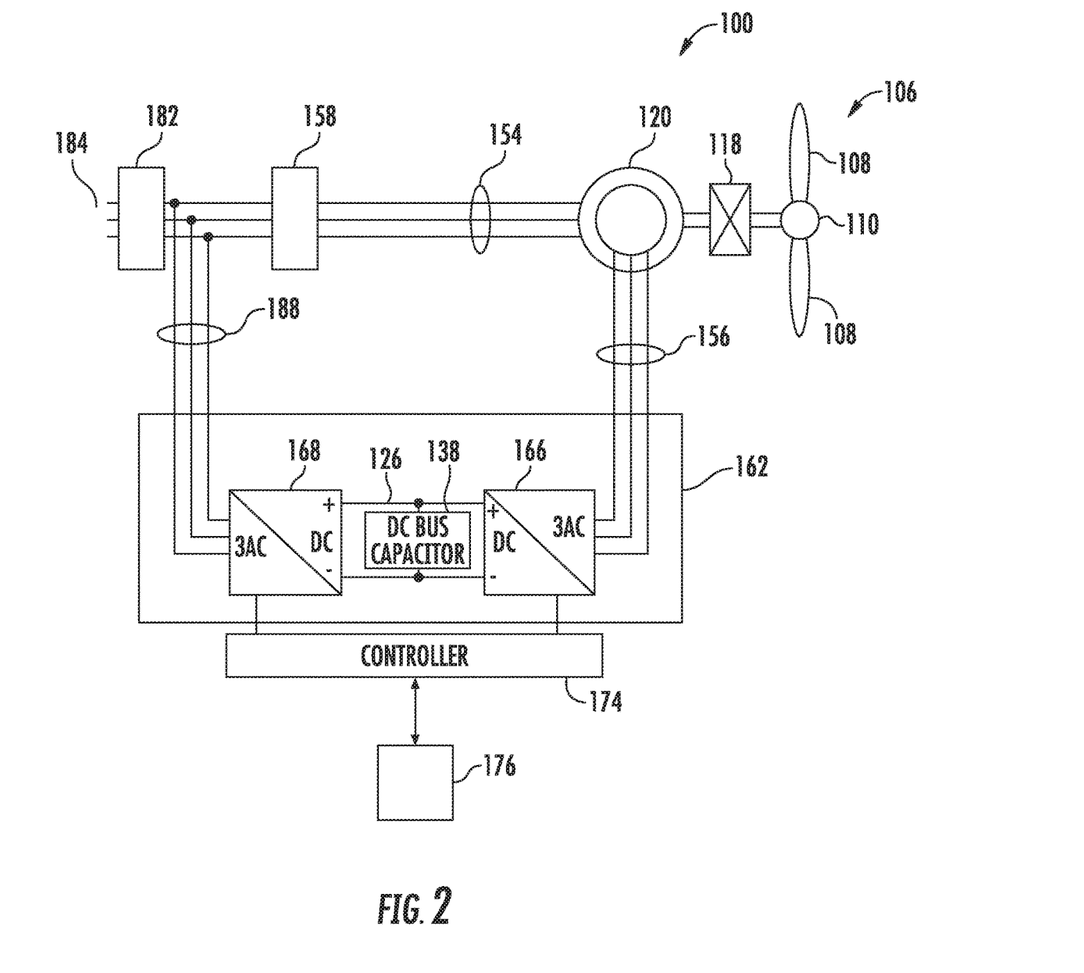
FIG. 2 depicts an example DFIG wind turbine system according to example embodiments of the present disclosure.

With reference now to the figures, example aspects of the present disclosure will be discussed in greater detail. For instance, FIG. 2 depicts an example DFIG wind turbine system 100. The present disclosure will be discussed with reference to the example DFIG wind turbine system 100 of FIG. 2 for purposes of illustration and discussion. Those of ordinary skill in the art, using the disclosures provided herein, should understand that aspects of the present disclosure are also applicable in other systems.

In the example system 100, a rotor 106 includes a plurality of rotor blades 108 coupled to a rotating hub 110, and together define a propeller. The propeller is coupled to an optional gear box 118, which is, in turn, coupled to a generator 120. In accordance with aspects of the present disclosure, the generator 120 is a doubly fed induction generator (DFIG) 120.

DFIG 120 is typically coupled to a stator bus 154 and a power converter 162 via a rotor bus 156. The stator bus provides an output multiphase power (e.g. three-phase power) from a stator of DFIG 120 and the rotor bus 156 provides an output multiphase power (e.g. three-phase power) of DFIG 120. The power converter 162 can be a bidirectional power converter configured to provide output power to the electrical grid 184 and/or to receive power from the electrical grid 184. As shown, DFIG 120 is coupled via the rotor bus 156 to a rotor side converter 166. The rotor side converter 166 is coupled to a line side converter 168 which in turn is coupled to a line side bus 188.

In example configurations, the rotor side converter 166 and the line side converter 168 are configured for normal operating mode in a three-phase, pulse width modulation (PWM) arrangement using SiC MOSFETs and/or IGBTs as switching devices. In some implementations, the rotor side converter 166 and/or the line side converter 168 can include a plurality of conversion modules, each associated with a an output phase of the multiphase power, as will be discussed in more detail with respect to FIG. 3. The rotor side converter 166 and the line side converter 168 can be coupled via a DC link 136 across which is the DC link capacitor 138.

The power converter 162 can be coupled to a controller 174 to control the operation of the rotor side converter 166 and the line side converter 168. It should be noted that the controller 174, in typical embodiments, is configured as an interface between the power converter 162 and a control system 176.

In operation, power generated at DFIG 120 by rotating the rotor 106 is provided via a dual path to electrical grid 184. The dual paths are defined by the stator bus 154 and the rotor bus 156. On the stator bus side 154, sinusoidal multiphase (e.g. three-phase) is provided to the electrical grid. In particular, the AC power provided via the stator bus 154 can be a MV AC power. On the rotor bus side 156, sinusoidal multiphase (e.g. three-phase) AC power is provided to the power converter 162. In particular, the AC power provided to the power converter 162 via the rotor bus 156 can be a LV AC power. The rotor side power converter 166 converts the LV AC power provided from the rotor bus 156 into DC power and provides the DC power to the DC link 136. Switching devices (e.g. SiC MOSFETs and/or IGBTs) used in parallel bridge circuits of the rotor side power converter 166 can be modulated to convert the AC power provided from the rotor bus 156 into DC power suitable for the DC link 136. Such DC power can be a LV DC power.

The line side converter 168 converts the LV DC power on the DC link 136 into a MV AC power suitable for the electrical grid 184. In particular, switching devices (e.g. SiC MOSFETs) used in bridge circuits of the line side power converter 168 can be modulated to convert the DC power on the DC link 136 into AC power on the line side bus 188. In addition, one or more isolation transformers coupled to one or more of the bridge circuits can be configured to step the voltage up to the MV voltage. The MV AC power from the power converter 162 can be combined with the MV power from the stator of DFIG 120 to provide multiphase power (e.g. three-phase power) having a frequency maintained substantially at the frequency of the electrical grid 184 (e.g. 50 Hz/60 Hz). In this manner, the MV line side bus 188 can be coupled to the MV stator bus 154 to provide such multiphase power.

Various circuit breakers and switches, such as grid breaker 182, stator sync switch 158, etc. can be included in the system 100 for isolating the various components as necessary for normal operation of DFIG 120 during connection to and disconnection from the electrical grid 184. In this manner, such components can be configured to connect or disconnect corresponding buses, for example, when current flow is excessive and can damage components of the wind turbine system 100 or for other operational considerations. Additional protection components can also be included in the wind turbine system 100.

The power converter 162 can receive control signals from, for instance, the control system 176 via the controller 174. The control signals can be based, among other things, on sensed conditions or operating characteristics of the wind turbine system 100. Typically, the control signals provide for control of the operation of the power converter 162. For example, feedback in the form of sensed speed of the DFIG 120 can be used to control the conversion of the output power from the rotor bus 156 to maintain a proper and balanced multiphase (e.g. three-phase) power supply. Other feedback from other sensors can also be used by the controller 174 to control the power converter 162, including, for example, stator and rotor bus voltages and current feedbacks. Using the various forms of feedback information, switching control signals (e.g. gate timing commands for switching devices), stator synchronizing control signals, and circuit breaker signals can be generated.

Figure 3:
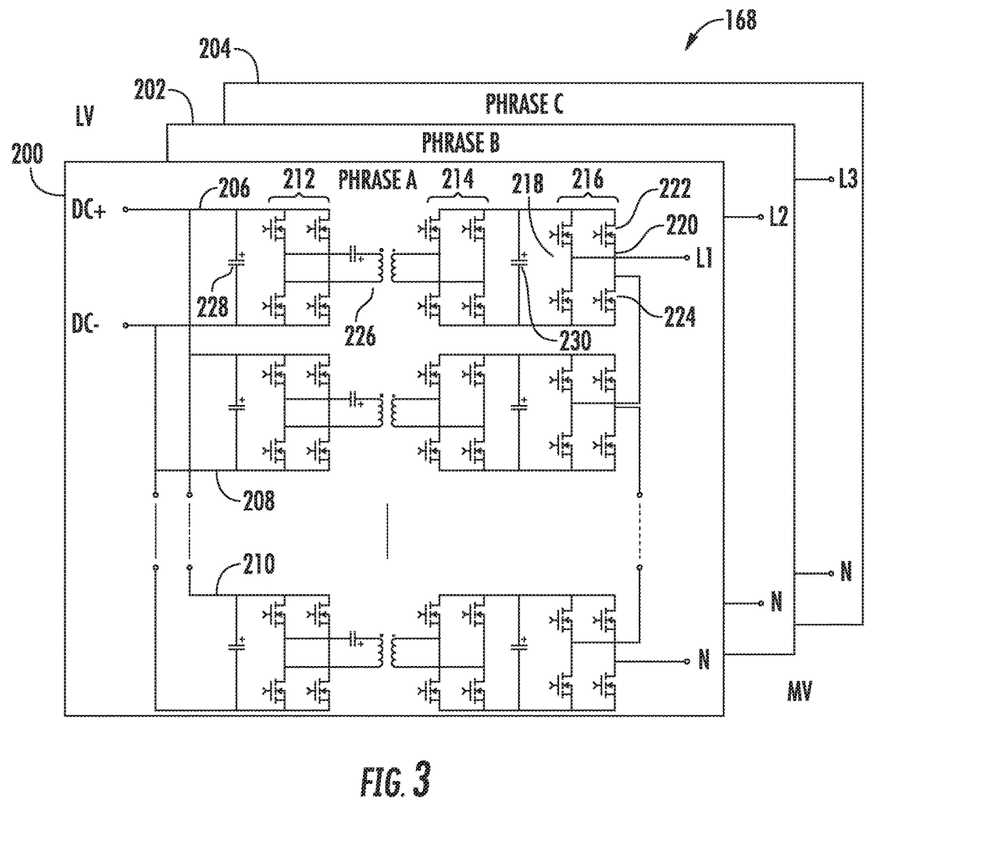
FIG. 3 depicts an example power converter according to example embodiments of the present disclosure.

FIG. 3 depicts an example line side converter 168 according to example embodiments of the present disclosure. As shown, the line side converter 168 includes conversion module 200, conversion module 202, and conversion module 204. Each conversion module 200-204 is associated with a single phase of three-phase output AC power. In particular, conversion module 200 is associated with the phase A output of the three-phase output power, conversion module 202 is associated with the phase B output of the three-phase output power, and conversion module 204 is associated with the phase C output of the three-phase output power.

Each conversion module 200-204 includes a plurality of module branches. For instance, as shown, conversion module 200 includes module branch 206, module branch 208, and module branch 210. Each module branch 206-210 comprises a plurality of conversion entities. For instance, module branch 206 includes conversion entity 212, conversion entity 214, and conversion entity 216. Each conversion entity 212-216 can include a plurality of bridge circuits coupled in parallel. For instance, conversion entity 216 includes bridge circuit 218 and bridge circuit 220. As indicated, each bridge circuit can include a plurality of switching devices coupled in series. For instance, bridge circuit 220 includes an upper switching device 222 and a lower switching device 224. The switching devices can be SiC MOSFET switching devices. As shown, each module branch 206-210 further includes an isolation transformer 226. The isolation transformer is coupled to conversion entity 212 and conversion entity 214. As shown, the conversion branches further include capacitors 228 and 230.

The line side converter 168 can be a bidirectional power converter. The line side converter 168 can be configured to convert a LV DC power to a MV AC power and vice versa. For instance, when providing power to the electrical grid 184, the line side converter 168 can be configured to receive a LV DC power from the DC link 136 on a LV side of the line side converter 168, and to output a MV AC power on a MV side of the line side converter 168. The module branches 206-210 can be coupled together in parallel on the LV side and can be coupled together in series on the MV side.

In one particular example implementation, when providing power to the electrical grid 184, the conversion entity 212 can be configured to convert the LV DC on the DC link 136 to a LV AC power. The isolation transformer 226 can be configured to step the LV AC power up to a MV AC power. The conversion entity 214 can be configured to convert the MV AC power to a MV DC power. The conversion entity 216 can be configured to convert the MV DC power to a MV AC power suitable for provision to the electric grid 184.

The module branches 206-210 can be configured to contribute to the overall MV AC power provided by the conversion module 200. In this manner, any suitable number of module branches can be included within the module branches 206-210. As indicated, each conversion module 200-204 is associated with a single phase of output power. In this manner, the switching devices of the conversion modules 200-204 can be controlled using suitable gate timing commands (e.g. provided by one or more suitable driver circuits) to generate the appropriate phase of output power to be provided to the electrical grid. For example, the controller 174 can provide suitable gate timing commands to the gates of the switching devices of the bridge circuits. The gate timing commands can control the pulse width modulation of the IGBTs to provide a desired output.

It will be appreciated, that although FIG. 3 depicts only the line side converter 168, the rotor side converter 166 depicted in FIG. 2 can include the same or similar topology. In particular, the rotor side converter 166 can include a plurality of conversion modules having one or more module branches as described with reference to the line side converter 168. Further, it will be appreciated that the line side converter 168 and the rotor side converter 166 can include SiC MOSFET switching devices, IGBT switching devices, and/or other suitable switching devices. In implementations wherein the rotor side converter 166 is implemented using SiC MOSFET switching devices, the rotor side converter 166 can be coupled to a crowbar circuit (e.g. multiphase crowbar circuit) to protect the SiC MOSFET switching devices from high rotor current during certain fault conditions.

Figure 4:
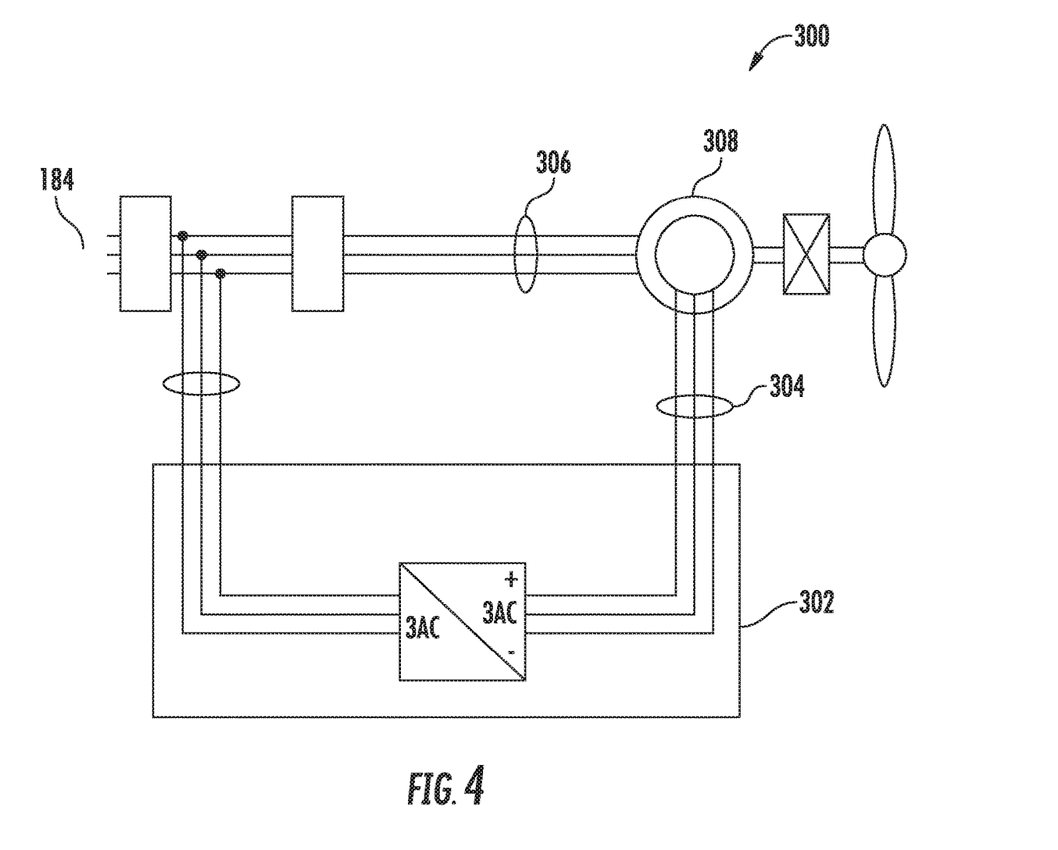
FIG. 4 depicts an example DFIG wind turbine system according to example embodiments of the present disclosure.

FIG. 4 depicts an example DFIG system 300 according to example embodiments of the present disclosure. In particular, DFIG system 300 can correspond to DFIG system 250 and DFIG system 100 depicted in FIGS. 1 and 2, respectively. DFIG system 300 can be configured to provide power to and/or receive power from the electrical grid 184. DFIG system 300 can include a DFIG 308 and a power converter 302 (e.g. single stage power converter) configured to convert a LV AC power provided on a rotor bus 304 by a rotor of the DFIG 308 to a MV AC power suitable for provision to the electrical grid 184. In this manner, the MV AC output power associated with the power converter 302 can be combined with a MV AC power provided on a stator bus 306 from a stator of the DFIG 308, and provided to the electrical grid 184.

Figure 5:
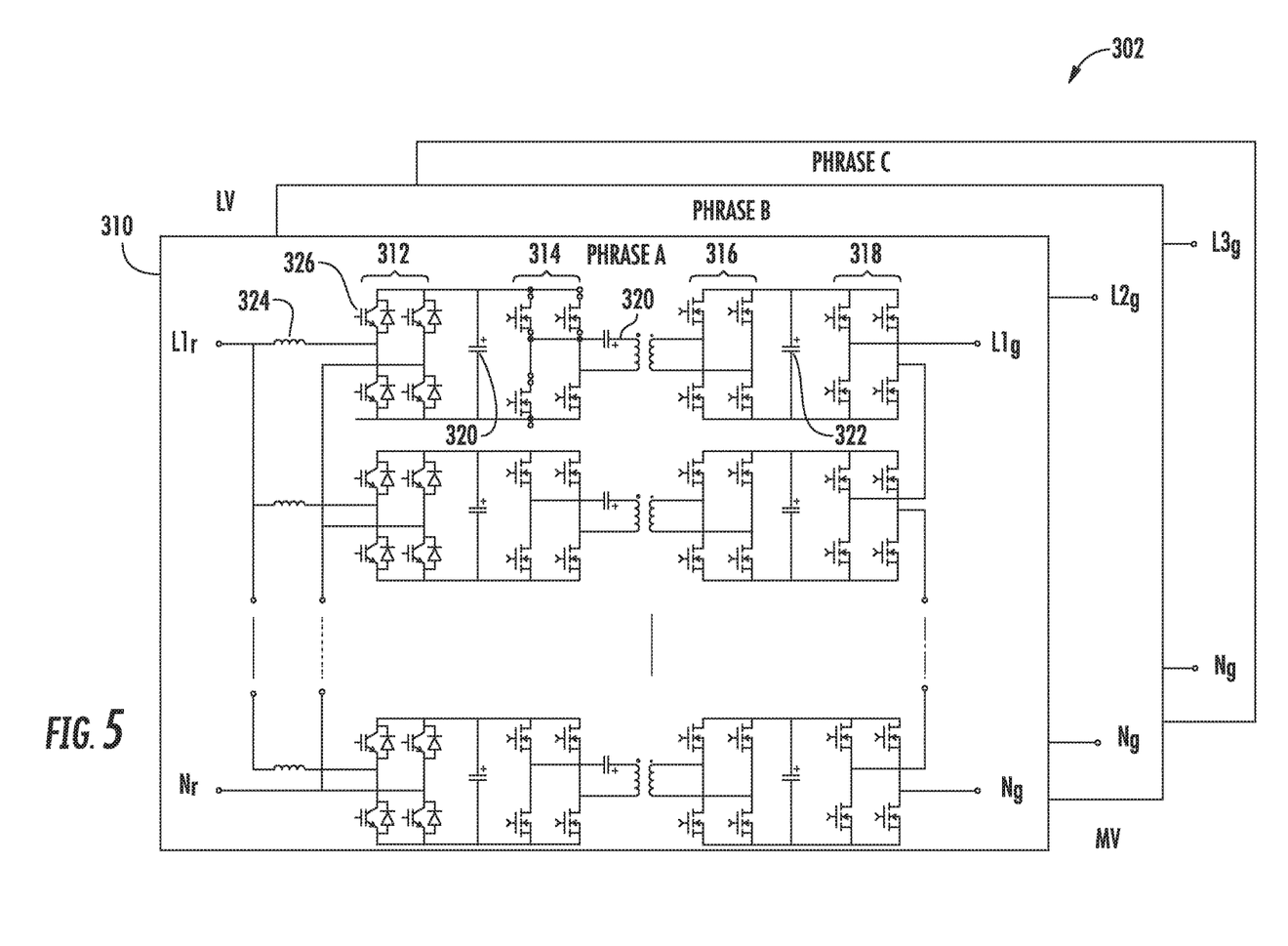
FIG. 5 depicts an example power converter according to example embodiments of the present disclosure.

FIG. 5 depicts a more detailed view of the power converter 302 according to example embodiments of the present disclosure. Similar to the line side converter 168 depicted in FIG. 3, the power converter 302 can include a plurality of conversion modules. Each conversion module is associated with a single phase of three-phase AC output power. Each conversion module can include one or more module branches configured to convert the LV AC power to a MV AC power and vice versa. The module branches can include a plurality of conversion entities. Each conversion entity can include a plurality of switching devices. The module branches can further include other suitable components, such as capacitor 322, and inductor 324.

The conversion module 310 can receive a LV AC power from the rotor bus 304 on a LV side of the power converter 302. A conversion entity 312 associated with the conversion module 310 can convert the LV AC power to a LV DC power. As shown, the conversion entity can include a plurality of IGBT switching devices (e.g. IGBT 326). Each IGBT switching device includes a diode coupled in parallel to the IGBT switching device. It will be appreciated that the conversion entity 312 can be implemented using various other suitable switching devices, such as SiC MOSFET switching devices. The conversion entity 314 can be configured to convert the LV DC power to a LV AC power, which can be stepped up to a MV AC power by the isolation transformer 320. The conversion entity 316 can be configured to convert the MV AC power to a MV DC power, and the conversion entity 318 can be configured to convert the MV DC power to a MV AC power suitable for provision to the electrical grid 184.

Figure 6:
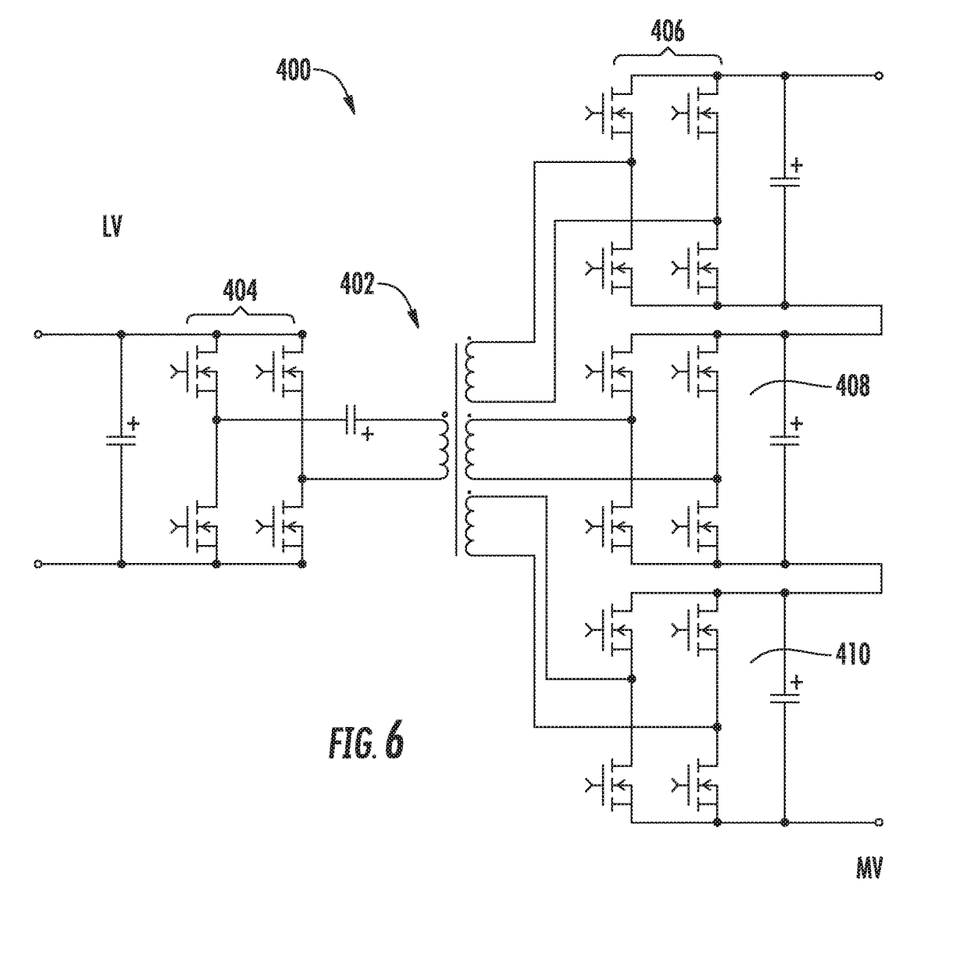
FIG. 6 depicts an example converter according to example embodiments of the present disclosure.

FIG. 6 depicts an alternative converter 400 according to example embodiments of the present disclosure. In particular, converter 400 can be configured to convert a LV DC to a HV DC and vice versa. The converter 400 can be implemented within a conversion module, such as one or more conversion modules as described with regard to FIGS. 3 and 5. For instance, the power converter 400 can correspond to conversion entities 212 and 214, and the corresponding conversion entities on module branches 208 and 210 depicted in FIG. 3. As shown, the power converter 400 includes a multi-winding transformer 402. The transformer 402 includes a single winding on a LV side of the converter 400 and multiple windings on a MV voltage side of the converter 400. The number of windings on the multiple winding side of the transformer 402 can correspond to a number of module branches to be included in the corresponding conversion module.

As shown, a single conversion entity 404 can be implemented on the LV side of the converter 400. The conversion entity 404 can be coupled to the single winding on the LV side of the transformer 400. The conversion entity 404 can be configured to convert a LV DC power to a LV AC power. The transformer 402 can be configured to step the LV AC power up to a MV AC power and to provide the MV AC power on each winding of the multiple winding side of the transformer 402. In particular, each winding on the multiple winding side of the transformer 402 can be coupled to a conversion entity (e.g. conversion entities 406-410). The conversion entities 406-410 can be configured to convert the MV AC power to a MV DC power, and to provide the MV DC power to respective other conversion entities for a conversion of the MV DC to a MV AC suitable for provision to a grid.

Figure 7:
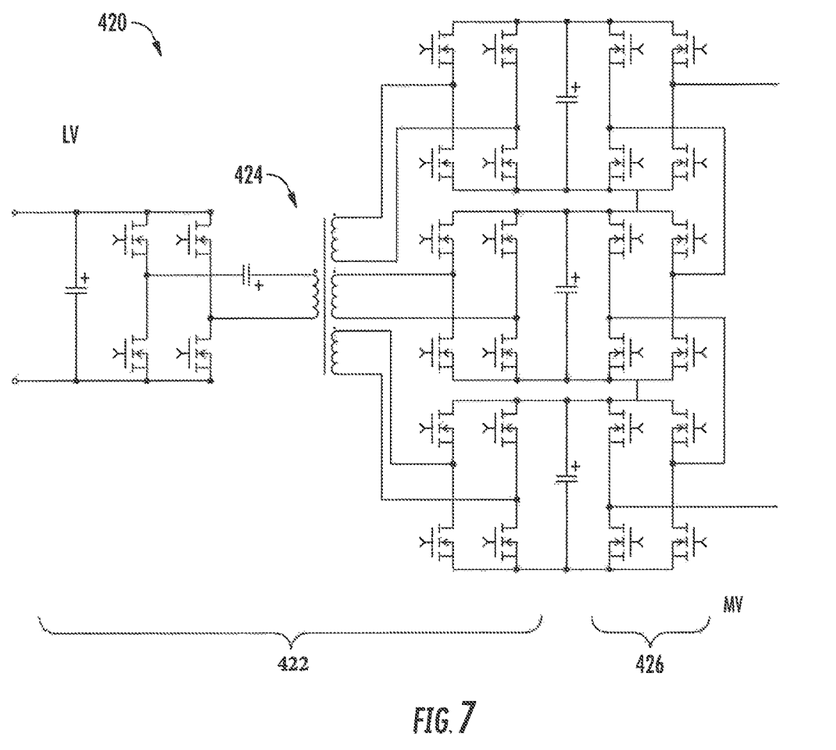
FIG. 7 depicts an example power converter according to example embodiments of the present disclosure.

FIG. 7 depicts an example power converter 420 according to example embodiments of the present disclosure. Power converter 420 can be implemented within various suitable wind turbine systems, such as DFIG systems 100, 300, and/or other suitable wind turbine system. For instance, the power converter 420 can correspond to the power converter 168 depicted in FIG. 3. In this manner, the power converter 420 can be a DC-DC-AC power converter.

As shown, a DC-DC portion 422 of the power converter 420 can correspond to converter 400 depicted in FIG. 6. In this manner, the DC-DC portion 422 can include a multi-winding transformer 424 having a single winding on a LV side of the power converter 420 and multiple windings (e.g. three windings) on a MV side of the power converter 420. The DC-DC portion 422 can be configured to convert a LV DC power to a MV DC power, and to provide the MV DC power to a DC-AC portion 426 of the power converter 420. The DC-AC portion 426 can convert the MV DC power to a MV AC power suitable for feeding to an AC power system.

The topologies of the converters 400 and 420 depicted in FIGS. 6 and 7 can facilitate a reduction in the number of transformers used relative to the topology of the power converter 168 depicted in FIG. 3. Further, the topologies of the converters 400 and 420 can facilitate a reduction in the number of switching devices used relative to the topology of the power converter 168 depicted in FIG. 3.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine system comprising:
    a wind driven doubly fed induction generator having a stator and a rotor, the stator coupled to an electrical grid, the stator configured to provide a medium voltage alternating current power on a stator bus of the wind turbine system; and
    a power converter configured to convert a low voltage alternating current power provided by the rotor to a medium voltage multiphase alternating current output power suitable for provision to the electrical grid, the power converter comprising a plurality of conversion modules, each conversion module being a replaceable unit and comprising one or more isolation transformers coupled to one or more of a plurality of bridge circuits and the one or more isolation transformers having a plurality of windings on a medium voltage side of the isolation transformer, each bridge circuit comprising a plurality of silicon carbide switching devices coupled in series;
    wherein each conversion module is configured to provide a single phase of the medium voltage multiphase alternating current output power on a line bus of the wind turbine system, wherein the number of the plurality of windings on the medium voltage side of the isolation transformer is based, at least in part, on generating output power suitable for being directly supplied to the electrical grid, and the line bus is directly coupled between the power converter and the stator bus.

2. The wind turbine system of claim 1, wherein at least one of the multi-winding isolation transformers comprises a single winding on a low voltage side.

3. The wind turbine system of claim 2, wherein each winding on the medium voltage side of the one or more multi-winding isolation transformers is coupled to at least one of the one or more bridge circuits of the at least one conversion module.

4. The wind turbine system of claim 3, wherein the single winding on the low voltage side of the multi-winding isolation transformer is coupled to at least one of the one or more bridge circuits of the at least one conversion module.

5. The wind turbine system of claim 1, wherein each conversion module comprises one or more module branches.

6. The wind turbine system of claim 5, wherein at least one conversion module comprises two or more module branches, and wherein the two or more module branches are coupled together in parallel on a low voltage side of the conversion module and coupled together in series on a medium voltage side of the conversion module.

7. The wind turbine system of claim 1, wherein the power converter is a two-stage power converter comprising a rotor side converter and a line side converter.

8. The wind turbine system of claim 7, wherein the plurality of conversion modules form a part of the line side converter.

9. The wind turbine system of claim 7, wherein the plurality of conversion modules form a part of the rotor side converter.

10. The wind turbine system of claim 1, further comprising:
    a controller configured to perform one or more operations, the one or more operations comprising:
        controlling an operational state of each of the plurality of silicon carbide switching devices such that the power converter can supply and receive power directly from the electrical grid.

11. A power converter for use in a doubly fed induction generator wind turbine system having a rotor and a stator, the stator configured to be coupled to an electrical grid, the stator configured to provide a medium voltage alternating current power on a stator bus of the wind turbine system, the power converter comprising:
    a plurality of conversion modules, each conversion module being a replaceable unit and comprising one or more isolation transformers coupled to one or more of a plurality of bridge circuits and the one or more isolation transformers having a plurality of windings on a medium voltage side of the isolation transformer, each bridge circuit comprising a plurality of silicon carbide switching devices coupled in series;
    wherein the power converter is configured to convert a low voltage alternating current power provided by the rotor to a medium voltage multiphase alternating current output power suitable for provision to the electrical grid, and wherein each conversion module is configured to provide a single phase of the medium voltage multiphase alternating current output power on a line bus of the wind turbine system, and wherein the number of the plurality of windings on the medium voltage side of the isolation transformer is based, at least in part, on generating output power suitable for being directly supplied to the electrical grid and the line bus is directly coupled between the power converter and the stator bus.

12. The power converter of claim 11, wherein at least one of the multi-winding isolation transformers comprises a single winding on a low voltage side.

13. The power converter of claim 12, wherein each winding on the medium voltage side of the one or more multi-winding isolation transformers is coupled to at least one of the one or more bridge circuits of the at least one conversion module.

14. The power converter of claim 13, wherein the single winding on the low voltage side of the multi-winding isolation transformer is coupled to at least one of the one or more bridge circuits of the at least one conversion module.

15. The power converter of claim 11, wherein each conversion module comprises one or more module branches.

16. The power converter of claim 15, wherein at least one conversion module comprises two or more module branches, and wherein the two or more module branches are coupled together in parallel on a low voltage side of the conversion module and coupled together in series on a medium voltage side of the conversion module.

17. The power converter of claim 11, wherein the power converter is a two-stage power converter comprising a rotor side converter and a line side converter.

18. The power converter of claim 17, wherein the plurality of conversion modules form a part of the line side converter.

19. A power conversion system comprising:
a plurality of conversion modules, each conversion module comprising a plurality of bridge circuits, and an isolation transformer coupled to at least two of the bridge circuits, the isolation transformer having a plurality of windings on a medium voltage side of the isolation transformer, wherein each bridge circuit comprises a plurality of switching devices coupled in series;
wherein the power conversion system is configured to convert a low voltage alternating current power provided by a doubly fed induction generator to a medium voltage multiphase alternating current output power suitable for provision to an alternating current power system, and wherein each conversion module comprises a replaceable unit and is configured to provide a single phase of the medium voltage multiphase alternating current output power on a line bus associated with the power conversion system, and wherein the number of the plurality of windings on the medium voltage side of the isolation transformer is based, at least in part, on generating output power suitable for being directly supplied to the electrical grid and the line bus is directly coupled between the power converter and the stator bus.

* * * * *

UNITED STATES PATENT AND TRADEMARK OFFICE
CERTIFICATE OF CORRECTION

PATENT NO. : 10,439,533 B2
APPLICATION NO. : 15/399049
DATED : October 8, 2019
INVENTOR(S) : Robert Gregory Wagoner et al.

It is certified that error appears in the above-identified patent and that said Letters Patent is hereby corrected as shown below:

In the Specification

In Column 1 Line 4, following the title of the invention and preceding the FIELD OF THE INVENTION section insert:
--STATEMENT REGARDING FEDERALLY SPONSORED RESEARCH OR DEVELOPMENT
This invention was made with Government support under Contract No. DE-EE0007252 awarded by the U.S. Department of Energy (DOE). The Government has certain rights in the invention--

Signed and Sealed this
Twenty-third Day of February, 2021

Drew Hirshfeld
*Performing the Functions and Duties of the
Under Secretary of Commerce for Intellectual Property and
Director of the United States Patent and Trademark Office*